United States Patent [19]

Koenig

[11] Patent Number: 5,524,124
[45] Date of Patent: Jun. 4, 1996

[54] MULTIPLE-FILTER EQUALIZER FOR STRUCTURED DIGITALLY MODULATED SIGNALS

[75] Inventor: Carolyn T. Koenig, Sunnyvale, Calif.

[73] Assignee: Signal Science, Inc., Santa Clara, Calif.

[21] Appl. No.: 153,451

[22] Filed: Nov. 17, 1993

[51] Int. Cl.$^6$ .................................................. H03H 7/30
[52] U.S. Cl. ............................................ 375/229; 375/232
[58] Field of Search ............................... 375/11, 14, 13, 375/229, 232, 233, 235; 364/724.19, 724.2; 395/24; 333/18, 28 R

[56] References Cited

U.S. PATENT DOCUMENTS

| | | | |
|---|---|---|---|
| 4,237,554 | 12/1980 | Gitlin et al. | 375/234 |
| 4,821,288 | 4/1989 | Pale | 375/229 |
| 5,048,055 | 9/1991 | Greigh et al. | 333/18 |
| 5,127,051 | 6/1992 | Chan et al. | 375/13 |
| 5,222,101 | 6/1993 | Ariyavisitakul et al. | 375/231 |
| 5,243,624 | 9/1993 | Paik et al. | 375/232 |
| 5,253,329 | 10/1993 | Villareal et al. | 395/24 |
| 5,257,265 | 10/1993 | Su et al. | 375/12 |
| 5,283,813 | 2/1994 | Shalvi et al. | 375/14 |
| 5,353,312 | 10/1994 | Cupo et al. | 375/232 |

OTHER PUBLICATIONS

"Adaptive Equalizer For TAMA Digital Mobile Radio" John G. Prodlsis, IEEE, pp. 333–341.

Gibson, Cowan and Edinburgh, "Decision Feedback Equalizer Using Neural Network Structures," IEE Proceedings, 137(4):221–5, 1990.

Falconer and Liung, "Application Of Fast Kalman Estimation To Adaptive Equalization," IEE Transactions on Communications, vol. Com–26, No. 10, Oct. 1978.

Friedlander, "Lattice Filters For Adaptive Processing," Proceedings of the IEEE, vol. 70, No. 8, Aug. 1992.

Godard, "Self–Recovering Equalization And Carrier Tracking In Two–Dimensional Data Communication System," IEEE Transactions on Communications, vol. Com–28, No. 11, Nov. 1980.

Leung and Haykin, "The Complex Backpropagation Algorithm," IEEE Transaction on Signal Processing, vol. 39, No. 9, Sep. 1991.

Qureshi, "Adaptive Equalization," IEEE Communications Magazine, 1982 IEEE.

*Primary Examiner*—Stephen Chin
*Assistant Examiner*—Tesfaldet Bocure
*Attorney, Agent, or Firm*—Skjerven, Morrill, MacPherson, Franklin & Friel; Edward C. Kwok

[57] ABSTRACT

An equalization and demodulation method for a structured digitally modulated signal provides a multiple filter equalizer, which comprises multiple, parallel, automatically adjustable processors. The multiple filter equalizer is applicable to a structured digitally modulated signal, such as a signal from time division multiplexing (TDM) of multiple data sources. The multiple filter equalizer exploits the repetitive structure of TDM signal data by employing multiple parallel processors each constructed according to the specific requirements at the position in the frame of a symbol to be demodulated. Each processor comprises one or more adaptive digital transversal filters, one or more nonlinear threshold operators, and a symbol decision operator. The transversal filters equalize the data, remove interfering signals, reduce intersymbol interference, and mitigate multipath and other propagation effects. After the samples corresponding to one frame of information symbols are equalized in parallel, the equalized samples are demodulated in parallel to generate demodulated information symbols for that frame. The method is applicable to adaptive equalization both with and without a known training sequence.

28 Claims, 5 Drawing Sheets

MULTIPLE-FILTER EQUALIZER FOR STRUCTURED DIGITALLY MODULATED SIGNALS

BACKGROUND OF THE INVENTION

1. Field of the Invention

This invention relates to digital signal processing; and, in particular, this invention relates to equalization and demodulation of signals which are modulated with a repetitive component.

2. Discussion of the Related Art

In many applications involving digital signals (i.e. signals which are sampled at discrete times), the transmitted signals are digitally modulated. Often, digital modulation results in a signal ("structured signal") which is not completely random but has some repetitive structure. For example, under a time-division multiplexing (TDM) protocol, multiple data streams ("tributary data streams") are interleaved to form a signal having a repetitive structure. Such a signal is typically divided into frames consisting of a number of time slots each assigned to a tributary data stream for transmission of its data. Usually, one or more markers ("fixed bits") are placed at predetermined time slots of a frame for synchronization. Often, multiple frames in turn form a "superframe", which is an even larger repetitive unit of the transmitted signal. Synchronization between the recipient and the signal transmitter is further enhanced by additional markers placed at predetermined time slots to demarcate the superframe. In addition, in a typical TDM signal, training sequences are periodically inserted at for synchronization of baud and carrier signals at the receiver, and for equalization adaptation. Hence, a number of inserted bit sequences form repetitive components in the TDM signal. In addition, if a tributary data stream is self-correlated, the resulting time-multiplexed signal will be periodically correlated.

A channel or transmission medium can impose distortion upon a signal transmitted through it. For example, in a crowded communications environment, signals can interfere with each other. In a mobile communications system, a signal may arrive at a receiving point via multiple paths at different times, leading to multipath distortions. These and other distortions can cause errors in demodulating the signal, leading to errors in recovering the transmitted symbols at the receiver. To mitigate the distortions in the channel, an adaptive equalizing filter ("adaptive equalizer") is often applied to the received signal. In such an adaptive equalizer, the weights of the filter adapt to the changing characteristics of the channel.[1] One class of adaptive equalizers is collectively known as adaptive linear equalizers[2].

[1] In a digital filter, the number of weights in a filter corresponds to the number of signal samples used to generate the output sample.
[2] An adaptive equalizer is an adaptive linear equalizer when the output value of the adaptive equalizer is a linear combination of its input value or values.

FIG. 1 is a block diagram representing the signal equalization and demodulation system 100 in a receiver. As shown in FIG. 1, a received signal is demodulated by element 101 to a base band signal by removing the carrier frequency $f_c$. The base band signal is then sampled by sampling device 102, at either the symbol interval, or a fraction of the symbol interval. In many systems, a tracking device 103 is provided to maintain sampling at a proper phase of the base band signal, The samples of the base band signal are then provided to an adaptive linear equalizer 110, represented in FIG. 1 by filter 105, error means 108 and filter weight update means 107. (When the base band signal is sampled at the symbol interval, the equalizer is known as a "T-spaced equalizer". Otherwise, i.e. when the base band signal is sampled at a fraction of the symbol interval, the equalizer is known as a "fractionally spaced equalizer".)

Generally, in an adaptive linear equalizer, such as adaptive linear equalizer 110, a finite transversal filter 105 computes a weighted sum of a number samples of the base band signal. This weighted sum is then provided to a decision device 106 to determine the symbol received (the "symbol decision"). In one type of equalizer, which is shown in FIG. 1, the decision device 106 provides a feedback signal to adaptively modify the weights of finite transversal filter 105. Such an equalizer is known as a "decision-directed", or "blind", equalizer.

As shown in FIG. 1, a phase-corrected output value 121 of transversal filter 105 and the symbol decision 122 of decision device 106 are fed back to error means 108 to generate an error signal 120. In FIG. 1, phase correction in the output value 121 of transversal filter 105 is provided by circuit 109, which compares the phases of the symbol decision 122 and the output value 123 of transversal filter 105 to detect any residual carrier-tracking phase error. The error signal 120 generated by error means 108 represents, assuming that the data symbol is correctly recovered, both amplitude and phase errors in the phase-corrected output value 121 of finite transversal filter 105. When a training sequence of data symbols is available, error signal 120 is generated by computing, at each time point, a complex difference between the phase-corrected sample 121 of the equalizing digital filter and the expected corresponding data symbol in the training sequence. Error signal 120 is fed into filter weight update means 107 to modify the weights of finite transversal filter 105. In FIG. 1, the phase error detected by phase correction device 109 is reintroduced into error signal 120, which is then provided to filter weight update means 107.

The feedback signal received by filter weight update means 107 can also be obtained by biasing ("respinning") symbol decision device 106 by the phase error and computing the complex difference between the respun symbol decision and the output value 123 of transversal filter 105.

Several algorithms exist to generate adaptively the weights of an adaptive linear equalizer. One common method is the least-mean-square (LMS) algorithm, first described by R. W. Lucky et al ("Lucky's LMS algorithm"). An overview of Lucky's LMS algorithm can be found in "Adaptive Equalization," by Shahid Qureshi, published in IEEE Communications Magazine, March, 1982, pp. 9–16. Improvements based on Lucky's LMS algorithm include (i) the recursive least squares (RLS) methods, such as those described in "Application of Fast Kalman Estimation to Adaptive Equalization," by D. D. Falconer and L. Ljung in IEEE Transactions of Communications, Vol. Com-26, No. 10, October 1978, pp. 1439–45; and (ii) the adaptive lattice methods, such as those described in "Lattice Filters for Adaptive Processing," by B. Friedlander in Proceedings of the IEEE, Vol. 70, No. 8, August 1982, pp. 829–67. These improvements are designed to converge more rapidly than Lucky's LMS algorithm. Other improvements upon Lucky's LMS method include methods which adjust the weights of the equalizing digital filter to optimize a characteristic of the desired signal. One example of such methods is the dispersion-directed method described in "Self-recovering Equalization and Carrier Tracking in Two-dimensional Data Communication Systems," by D. Godard, IEEE Transactions on Communications, Vol. Com-28, No. 11, November 1980, pp. 1867–75.

Another architecture for adaptive linear equalization is the decision feedback equalizer (DFE). The DFE equalizer architecture consists of both a forward digital filter, which computes a weighted sum of input samples, similar to those based on Lucky's LMS described above, and a feedback digital filter which computes a weighted sum of data symbols determined in previous symbol decisions. In a DFE equalizer, the numbers of coefficients in the forward and feedback filters can be different. The decision process is applied to the sum of the output values of the forward and backward equalization filters to generate a symbol. As in all adaptive equalizers, an error signal is provided to update the filter weights and to improve filter performance.

Yet another adaptive equalization method, which uses an artificial neural network (ANN), is described by S. Siu, G. J. Gibson and C. F. N. Cowan in "Decision Feedback Equalizer Using Neural Network Structures," IEE Proceedings, 137(4): 221–5, 1990. In the ANN method, the signal samples are sequentially provided as input; samples into each ANN processing unit of a first layer of a neural network. The output samples of the first layer's processing units are then provided as input samples into each processing unit of a second layer of the ANN. The output samples of the processing units in this second layer are then provided as input samples into a single output processing unit. A decision process is then applied to each output sample of the output processing unit to generate a symbol. In this ANN, each processing unit consists of a finite transversal filter with adjustable weights, and a nonlinear functional operator which operates on the output sample of the finite transversal filter. The filter weights of the transversal filter are computed during the processing of a training sequence. The error signal for the ANN is obtained by subtracting from each data symbol of a training sequence from the corresponding data symbol output of the output processing unit. A back propagation algorithm is used to generate new coefficients for each processing unit. The ANN architecture can also incorporate feedback using previously decided symbols to become a decision feedback ANN architecture.

Each of the methods discussed above in the prior art processes sequential signal samples to generate, for each iteration, one output symbol and an error signal. The error signal is used in an updating procedure for filter weights to adaptively modify the transversal filters of the equalizer for the next iteration. The equalizer, with the updated filter weights, is then used to generate the next symbol. The process continues until all symbols are decoded one by one.

The methods used in the prior art assume that the symbols in the input data are random. However, when the input signal is a structured signal, i.e. the signal includes a periodic component, the filter adaptation process generates transversal filter weights that are skewed by the periodic component. Consequently, the periodic component of the input signal is amplified while the aperiodic component of the input signal is attenuated. Recalling that, in a structured signal such as a TDM signal, the periodic component is substantially an artifact of the signal protocol, e.g. the framing structure, and often does not relate to the tributary data being transmitted, the amplification of the periodic component is therefore undesirable. Thus, to enhance the performance of a prior art method operating on a signal with a periodic component, one approach requires the signal to be randomized prior to transmission and derandomized at the receiver after equalization. The additional costs of the randomization and derandomization steps add to system cost, complexity, and processing time.

Another approach taken in the prior art to overcome the overweighting of the periodic components of a signal uses an equalizing filter comprising a tapped delay line which takes into account only signal samples spanning a time period shorter than the period of the framing information. However, this approach reduces the frequency resolution of the equalizer and handicaps the equalizing filter's ability to excise signal interference and multipath effects.

Yet another prior art approach prevents further updates to filter weights after the filter has converged to some useful value, but prior to the time the filter weights begin to destroy the aperiodic or "random" data. However, this approach also reduces the equalizer's capability to reject interference and to compensate for distortion.

SUMMARY OF THE INVENTION

In accordance with the present invention, a method and a structure for equalizing and demodulating a structured signal are provided. The structured signal consists of a number of symbols transmitted in a frame. The structure of the present invention comprises a processor for each symbol position in the frame. Each processor comprises a transversal digital filter, which computes a weighted sum of a predetermined number of samples of said structured signal to provide an equalized sample. The equalized sample is used by a decision device to determine the symbol transmitted at the symbol position in the frame.

In one embodiment, each processor includes a single adaptive transversal filter, in which weights are updated according to the error between the equalized sample and the symbol decision. In such an embodiment, an adaptive linear equalization algorithm can be applied. A phase error correction device, which corrects phase errors by comparing the phase of a symbol decision with the phase of an equalized sample of the multiple filter equalizer, can also be provided.

In another embodiment, each processor is provided with more than one transversal filter in a first level structure, which also includes a plurality of non-linear operators each operating on an output value of a corresponding one of the transversal filters. Each of the non-linear operators of the first level structure provides an equalized output value, which is used by a corresponding transversal digital filter in a second level structure to compute an equalized sample. Each output value of this second level structure is provided to a decision device for a symbol decision. The weights in the transversal filters of this multiple level structure can be updated in accordance with a backpropagation algorithm.

The present invention avoids overemphasis of the periodic component of a structured signal by using a processor for equalization and demodulation of each symbol in a frame. The processors can run concurrently and are each tailored to generate a symbol at a specified symbol position in a frame of the structured signal. Since each symbol position, which may correspond to a tributary data stream in a time division multiplexed (TDM) signal, has a distinct equalization processor, the resulting composite signal can be tailored by each these processors to avoid emphasis of a periodic component. Consequently, convergence of filter weights under an adaptive algorithm is not affected by the periodic component of the structured signal. Each processor can also include transversal filters spanning an appropriate number of signal samples to mitigate channel effects and to converge to a set of optimum coefficients or weights. Because the transversal filters are configured to reflect the structure of the signal, interfering signals collocated in the signal band can be suppressed. The coefficients of the individual transversal filter converge to values which minimize the bit-error-rate of the demodulated information symbols.

The present invention is better understood upon consideration of the detailed description below and the accompanying drawings.

DETAILED DESCRIPTION OF THE PREFERRED EMBODIMENTS

The present invention provides a method for equalizing and symbol demodulating a structured signal, e.g. a time-division multiplexed (TDM) signal. A TDM signal can be modulated by any of a number of modulation schemes, such as phase shift key (PSK), frequency shift key (FSK), or quadrature amplitude modulation (QAM). One of ordinary skill will appreciate from the following discussion that the present invention is not limited by the modulation scheme used.

Figure 2:
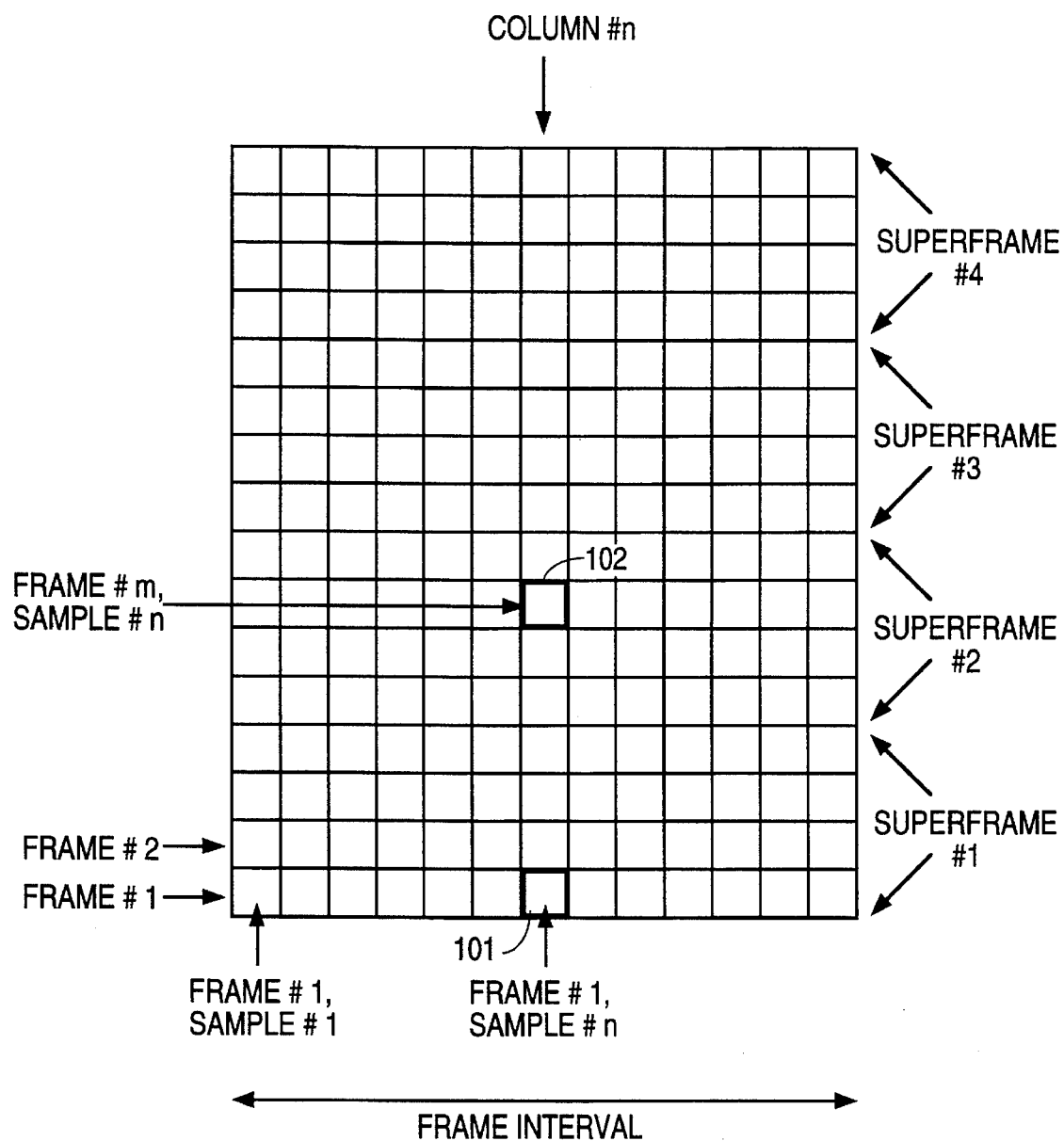
FIG. 2 is a data representation of a structured signal having frames and superframes.

FIG. 2 shows a two-dimensional representation of data in a structured signal over a time period of four superframes. In FIG. 2, each square represents a data sample, and each row of squares represents the samples of a frame, and each superframe consists of four frames transmitted successively in time. The data are sampled either at symbol interval (i.e. each sample representing a symbol), or at a fraction of the symbol interval (i.e. a number of samples together representing a symbol). As shown in FIG. 2, each frame is aligned in time with each other, so that a vertical column in FIG. 2 consists of samples in corresponding positions in the frames shown. Thus, for example, sample 101 represents the nth sample of frame number 1, and sample 102 represents the nth sample in frame number m. Of course, the number of samples in a frame and the number of frames in a superframe shown in FIG. 2 are merely illustrative. The present invention is applicable to any framing structure.

The present invention provides an equalizer comprising, for each data symbol position in a frame, a "processor", which includes a transversal filter and means for adaptively updating the transversal filter. The transversal filter geometry can be described using the data representation of FIG. 2. In general, the filters can be noncausal. Filter samples separated by integral number of frames compensate for noise in the tributary data stream and avoid artifacts due to the frame structure, the superframe structure, or both. On the other hand, filtering adjacent samples ("horizontal samples") compensates for channel effects, including intersymbol interference and multipath interference.

Figure 3:
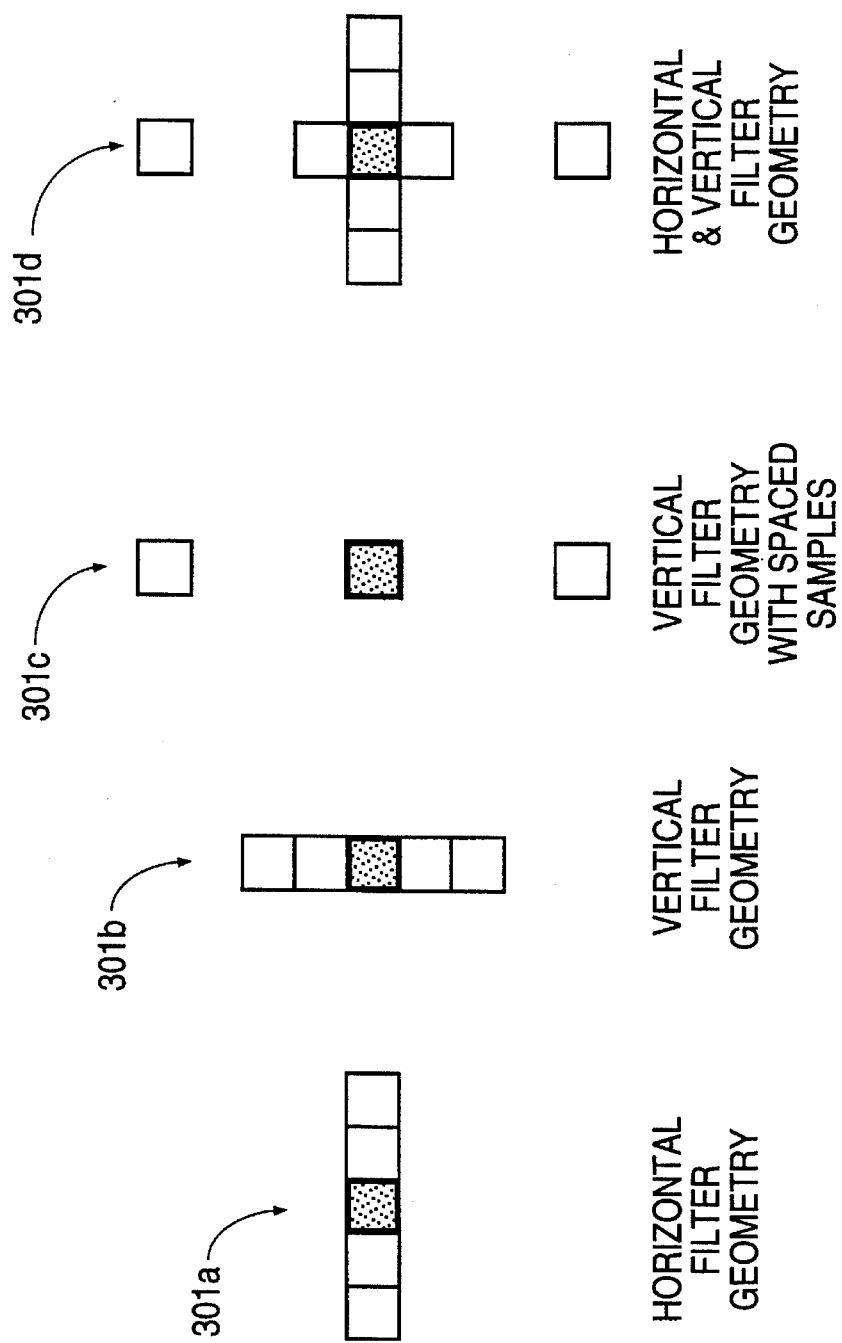
FIG. 3 shows four transversal filters 301a–301d under the equalization methods of the present invention.

Four examples of transversal digital filters 301a–301d of the present invention are shown in FIG. 3. In FIG. 3, in each filter, the shaded square represents the expected position in a frame of the filter's output data value. For example, filter 301a computes a weighted sum of five samples, for the sample positioned at the center of these five samples. Filter 301a has the following system function (in Z-transform notation):

$$H(z)=a_{-2}Z^{-2}+a_{-1}Z^{-1}+a_0Z^0+a_1Z^1+a_2Z^2$$

Alternatively, Filter 301b, which computes a weighted sum of corresponding samples over five frames, has the system function:

$$H(z)=a_{-2N}Z^{-2N}+a_{-N}Z^{-N}+a_0Z^0+a_NZ^N+a_{2N}Z^{2N}$$

where N is the number of samples in a frame.

Another variation of a transversal filter of the present invention is given by filter 301c, which computes a weighted sum of data corresponding samples separated by an integral multiple of frames. Filter 301c has the system function:

$$H(z)=a_{-pN}Z^{-pN}+a_0Z^0+a_{pN}Z^{pN}$$

where p and N are, respectively, the number of frames separating the corresponding samples and the number of samples in a frame.

Filter 301d is a filter which takes into account samples both proximate in time and occupying corresponding data sample positions spanning a number of frames. Filter 301d has the system function:

$$H(z)=a_{-pN}Z^{-pN}+a_{-N}Z^{-N}+a_{-2}Z^{-2}+a_{-1}Z^{-1}+a_0Z^0+a_1Z^1+a_2Z^2+a_NZ^N+a_{pN}Z^{pN}$$

where p and N are as defined above with respect to filter 301c.

Although the filters shown in FIG. 3 give non-zero weights to samples located symmetrically about the output symbol position, such symmetry is not required by the present invention.

Figure 4:
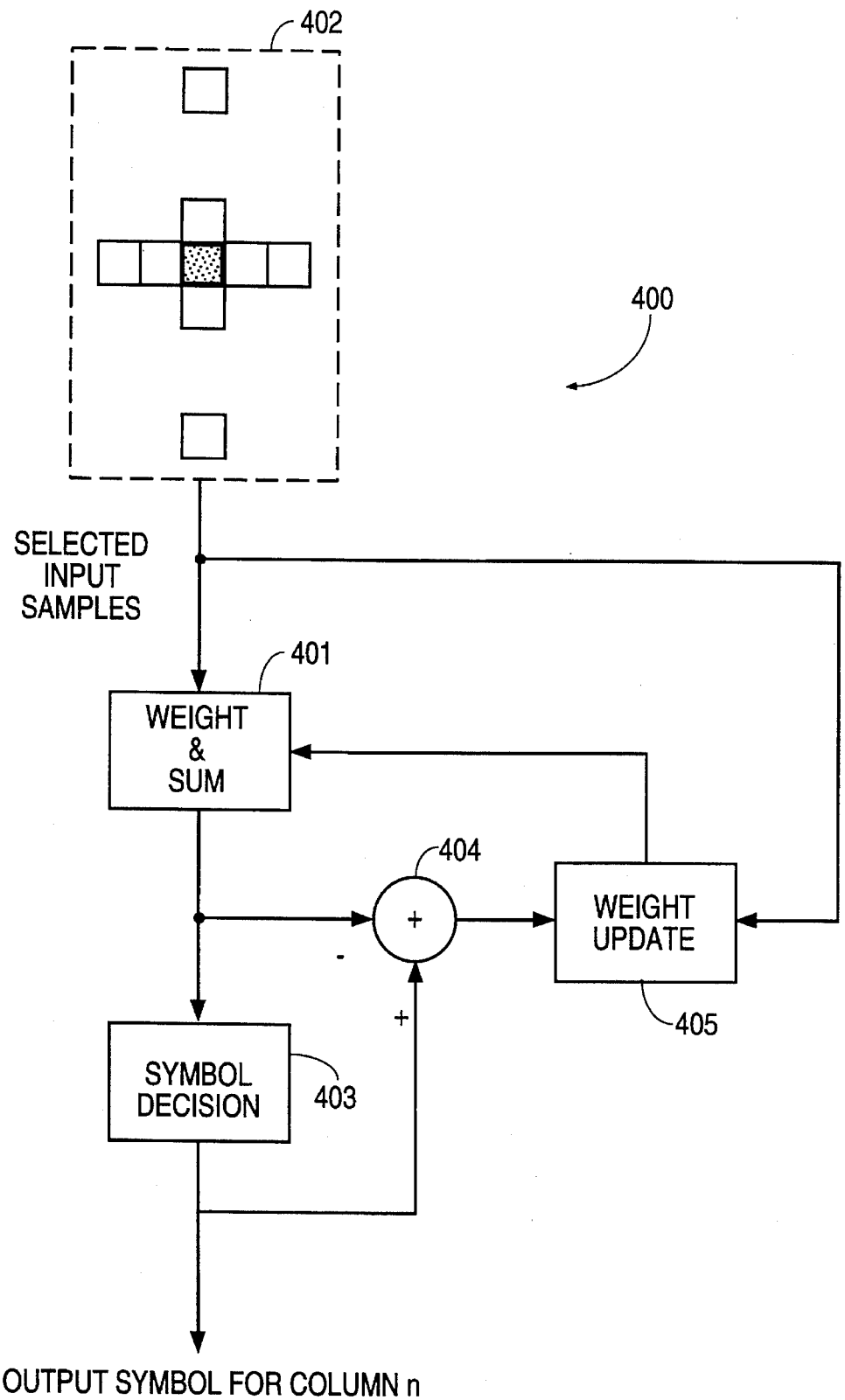
FIG. 4 shows a processor 400 of an equalizer in a "single layer architecture" embodiment of the present invention.

FIG. 4 shows a processor 400 of an equalizer in one embodiment of the present invention. The embodiment shown in FIG. 4 is referred to as a "single layer architecture," having one transversal filter per symbol position in a frame. As shown in FIG. 4, a transversal filter 401, receiving input samples shown by the representation in box 402, provides an output value to symbol decision device 403. Symbol decision device 403 determines the demodulated symbol from filter 401's output value.

The modulation format determines how symbol decision device 400 operates to decode a symbol. For example, under a BPSK format, the filter signal is compared to a threshold to determine whether a the symbol is a "1" or a "−1". Under a QAM format, however, the output symbol is the nearest symbol state in the quadrature-phase space. Under an FSK format, if a frequency detection step is performed prior to equalization/demodulation, the symbol decision is similar to the symbol decision under BPSK. However, if the input signal to the equalizer/demodulator is baud sampled data, then a frequency modulation discriminator is applied to the equalized samples of each symbol period to determine the symbol encoded in the frequency of the equalized samples.

Figure 1:
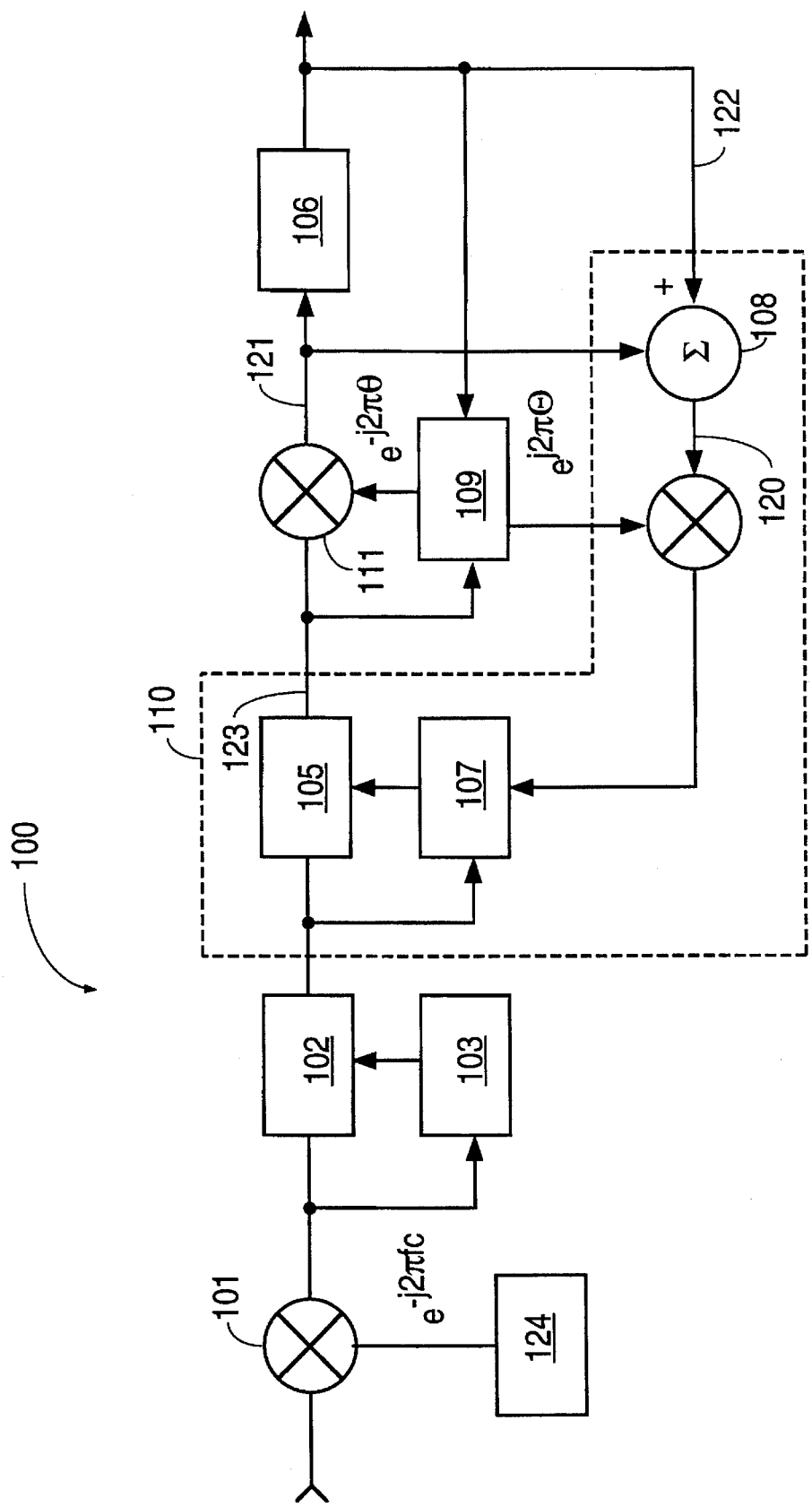
FIG. 1 is a block diagram showing demodulation and decision-directed equalization of a signal at a receiver, in accordance with prior art methods.

An error signal generating device 404 provides an error signal based on the output values of transversal filter 401 and symbol decision device 403. The error signal is fed into weight update device 405 to update the filter weights or coefficients, using any one of the adaptive algorithms described above. Decision-directed carrier tracking can be incorporated using approaches similar to those described above with respect to FIG. 1. For example, phase errors in the filtered output data of transversal filter 401 can be corrected prior to symbol decision at symbol decision device 403. Such phase error, as shown in FIG. 1, can be measured by comparing a previous symbol decision to the corresponding filtered output data of transversal device 401. Thus, processor 400 comprises both a decision-directed equalizer for a specified symbol in a frame, and a decision-directed carrier tracking and down-conversion loop to center the signal spectrum at 0 Hz. When a decision-directed carrier tracking system is used, performance of the multiple-filter equalizer of the present invention is expected to be higher than a conventional equalizer because the multiple-filter equalizer is expected to deliver a higher percentage of correct symbol decisions, which allow better carrier tracking.

As mentioned above, an independent processor is configured in the equalizer of the present invention for each symbol position in the data frame. The input samples provided to each processor are samples selected on the basis of their positions with respect to the symbol being demodulated. In this embodiment, for each frame, all symbols contained in the frame are processed in parallel, so that, for every iteration of the process (i.e. every time the filter weights are updated), all symbols in one frame are equalized and symbol demodulated.

If phase correction is provided by each processor independently of other processors, the Nyquist sampling criterion requires that the bandwidth of the phase error does not exceed one half of the frame rate, which is the rate at which the phase error is sampled. Otherwise, i.e. if the Nyquist sampling criterion is not met, aliasing may affect proper detection of the phase error. In that case, to correct in a processor the phase error detected in a base band signal, phase errors from adjacent processors must be considered, thereby requiring some synchronization between processors. Alternatively, parallelism may be maintained if, for each frame, each processor uses the same phase error correction. Such phase error correction can be obtained by filtering the phase errors of all symbol locations in the previous frame.

Yet another approach to provide phase error correction is to make, for each frame, symbol decisions in a predetermined order based on symbol location. In such a system, the phase error or errors detected in one or more previous symbol decisions are provided to correct the equalizer in the current symbol decision. This approach is equivalent to providing a single carrier correction loop for all symbol locations. Of course, under this approach, symbol decisions would have to be made in a predetermined order.

Figure 5:
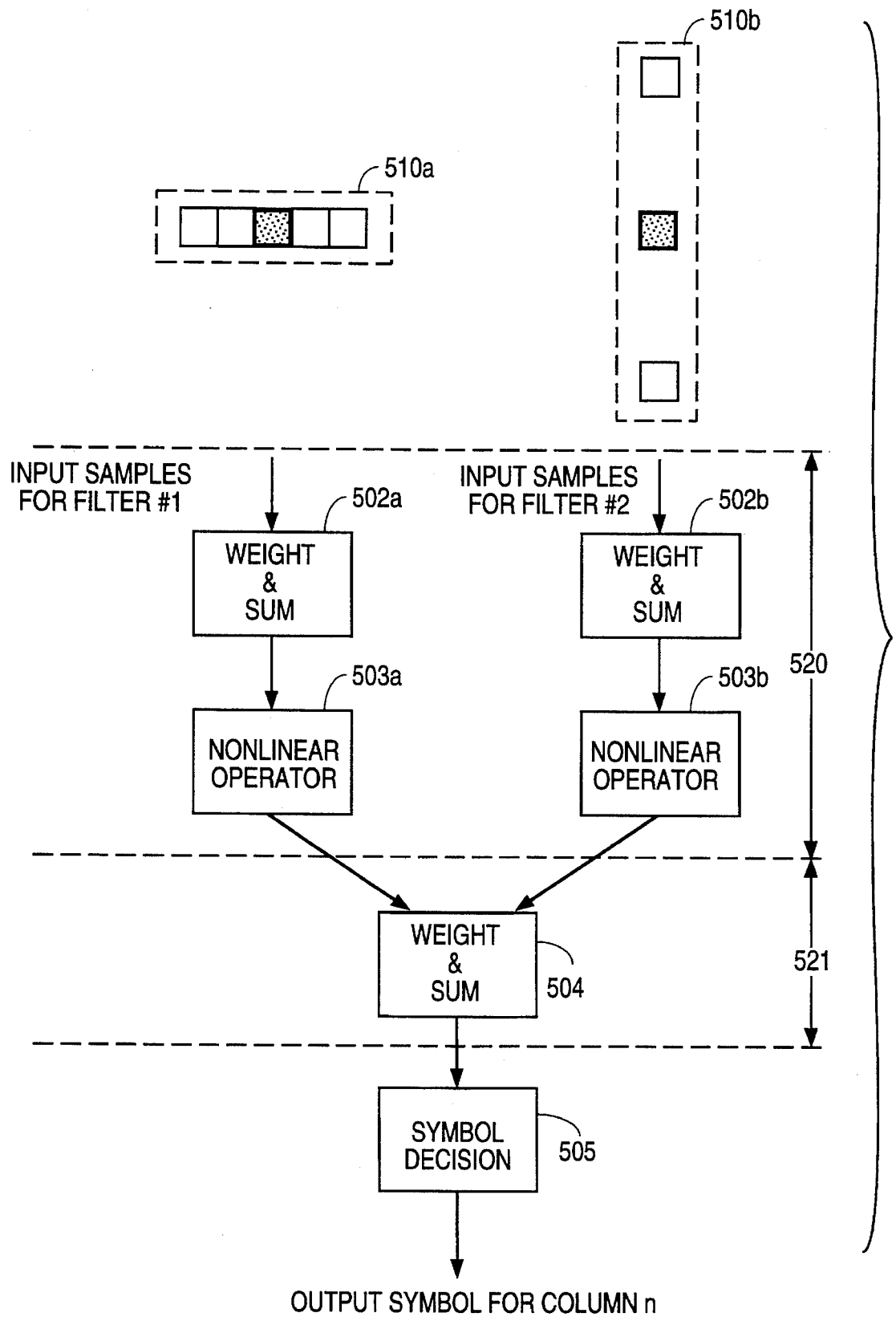
FIG. 5 shows a processor 500 of an equalizer in a "multiple layer architecture" embodiment of the present invention.

A processor 500 according to an alternative embodiment of the present invention is shown in FIG. 5. This alternative embodiment, which is referred to as the "multiple layer architectures," provides a processor including multiple transversal filters per symbol position in a frame. A processor of the multiple layer architecture consists of multiple transverse filters arranged in parallel in each level, with the levels of transversal filters connected in series. As shown in FIG. 5, a first layer 520 of transversal filters is shown comprising parallel transversal filters 502a and 502b having different geometries. Filters 502a and 502b are shown to have geometries indicated respectively by representations 510a and 510b. (Of course, the geometries shown in representations 510a and 510b are provided herein for illustration only; the present invention is not limited by the geometries of the filters in representations 510a and 510b.) Representation 510a corresponds to samples adjacent in time within the same frame. Representation 510b, however, corresponds to samples of the same symbol positions in three different frames, with successive samples separated by two frame intervals.

Operators 503a and 503b apply a non-linear function to the respective output values of filters 502a and 502b. Some examples of suitable non-linear functions are sigmoidal, or logistic, functions[3,4]. The output values of nonlinear operators 503a and 503b are used to compute a weighted sum by a second-layer filter 504. (The non-linear operators 503a and 503b are required to separate the first-layer filters 502a and 502b from the second-layer filter 504. Otherwise, the combination of a first-layer filter and its corresponding second-layer filter can be considered a single linear filter, thereby reducing the combination to an instance of the single-layer architecture.) The output value of filter 504 is then used by a symbol decision device 505 to generate a demodulated symbol.

[3] An example of a sigmoidal function is the function:
[4] The multiple-filter equalizer of the present invention operates on complex arguments. However, the sigmoidal function of a complex argument has singularities at various locations of the complex plane. To avoid these singularities, the signal input data must be scaled so that the range of the complex argument falls into suitable regions of the complex planes. Techniques for scaling input data to a sigmoidal function to avoid singularities are known in the art. (See, for example, "The Complex Backpropagation Algorithm," by Henry Leung and Simon Haykin, IEEE Transactions on Signal Processing, Vol. 39, No. 9, September 1991, pp. 2102–2104.)

$$f(y) = \frac{2}{1 + e^{-\frac{y}{c}}} - 1$$

While FIG. 5 shows two filters 502a and 502b for first layer 520 of processor 500, additional filters with different geometries can be used, depending upon the signal structure and the types of distortion in the channel. For example, processor 500 can incorporate decision-feedback equalization techniques by feeding back, for each symbol position, previous symbol decisions to a designated combination of a first-layer filter and an associated nonlinear operator in layer 520. In this configuration, the benefits of a "decision feedback equalizer" can be incorporated into multiple-filter equalizers of the present invention.

The weights of each transversal filter in a multiple layer architecture processor, such as processor 500, can be updated according to the backpropagation algorithm common in artificial neural network (ANN) processing, or according to any suitable feedforward ANN weight updating procedure. Other suitable weight-update algorithms include generalizations of dispersion-directed algorithms, Kalman algorithms, or any other suitable neural network weight-update algorithm. The backpropagation algorithm requires only that the nonlinear operator be a differentiable function. The aforementioned sigmoidal (or logistic) functions are therefore examples of suitable non-linear operators under the backpropagation algorithm. Other non-linear operators are suitable for one or more of these weight-update approaches.

The same symbol decision methods as described for the single layer architecture can be used for a processor of the multiple layer architecture. Thus, in processor 500, one frame of symbols is equalized and demodulated per iteration. The multiple layer architecture with the backpropagation algorithm can operate in a blind decision-directed mode or use a training sequence.

The above detailed description is provided to illustrate the specific embodiments of the present invention and is not intended to be limiting of the present invention. Numerous modifications and variations are possible within the scope of the present invention. For example, although the above detailed description provides examples of decision-directed carrier tracking, the present invention is equally applicable to systems in which a different carrier-tracking system is used, including a system in which symbol decision feedback is not used. Such a carrier-tracking system, for example, can provide phase error correction prior to equalization. An example of such a method is the "power of N carrier recovery" method described in § 14.2 of Digital Communication, by Edward Lee and David Messerschmitt, Kluwer Academic Publishers, 1988. The present invention is defined by the following claims.

I claim:

1. A structure for equalizing and demodulating a structured signal, said structured signal having a predetermined number of symbols transmitted in a frame, said structure comprising a separate processor for each symbol position in said frame, each processor comprising:

a transversal digital filter computing a weighted sum of a predetermined number of samples of said structured signal and providing said weighted sum as an equalized sample; and a decision device, coupled to receive said equalized sample, for determining from said equalized sample, independently of symbol decisions at other symbol positions in said frame, a symbol transmitted at said symbol position in said frame.

2. A structure as in claim 1, wherein each processor further comprises means, coupled to receive one or more of said samples, said symbol and said weighted sum, for updating the weights of said transversal digital filter.

3. A structure as in claim 1, wherein each processor further comprises means, coupled to receive said symbol and said weighted sum, for correcting a phase error in said weighted sum.

4. A structure as in claim 1, wherein, within each processor, each transversal filter is one of a plurality of transversal filters in a first level structure of said processor, said processor further comprising:

a plurality of non-linear operators, each non-linear operator operating on an output value of a corresponding one of said plurality of transversal filters to provide a first level equalized output value; and a transversal digital filter in a second level structure receiving said first level equalized output values for computing a weighted sum of said equalized output values to obtain said equalized sample.

5. A structure as in claim 2, wherein said weights are updated in accordance with an adaptive algorithm.

6. A structure as in claim 4, wherein said weights are updated in accordance with a backpropagation algorithm.

7. A structure as in claim 4, wherein said non-linear operators each comprise means for providing a differentiable function.

8. A method for equalizing and demodulating a structured signal, said structured signal having a predetermined number of symbols transmitted in a frame, said method comprises, for each symbol position in said frame, the steps of:

computing in a separate transversal digital filter a weighted sum of a predetermined number of samples of said structured signal and providing said weighted sum as an equalized sample; and determining in a decision device, coupled to receive said equalized sample, independently of symbol decisions at other symbol positions in said frame, a symbol transmitted at said symbol position in said frame.

9. A method as in claim 8, further comprising the step of updating the weights of said transversal digital filter.

10. A method in claim 8, further comprising the step of correcting a phase error in said weighted sum using said symbol and said weighted sum.

11. A method as in claim 8, wherein said step of computing in a separate transversal digital filter provides a plurality of transversal filters in a first level structure, said method further comprising the steps of:

providing a plurality of non-linear operators, each non-linear operator operating on an output value of a corresponding one of said plurality of transversal filters to provide a first level equalized output value; and computing in a transversal digital filter in a second level a weighted sum of said first level equalized output values to obtain said equalized sample.

12. A method as in claim 9, wherein said weights are updated in accordance with an adaptive algorithm.

13. A method as in claim 11, wherein said weights are updated in accordance with a backpropagation algorithm.

14. A method as in claim 11, wherein said non-linear operator applies a differentiable function.

15. A structure for equalizing and demodulating a structured signal, said structured signal having a predetermined number of symbols transmitted in a frame, said structure comprising a first processor and a second processor, each processor being provided for a corresponding one of a first symbol position and a second symbol position in said frame, each of said first and second processors comprising:

a transversal digital filter computing a weighted sum of a predetermined number of samples of said structured signal and providing said weighted sum as an equalized sample; and a decision device, coupled to receive said equalized sample, for determining from said equalized sample, independently of symbol decisions at other symbol positions in said frame, a symbol transmitted at said symbol position corresponding to said processor in said frame.

16. A structure as in claim 15, wherein each processor further comprises means, coupled to receive one or more of said samples, said symbol and said weighted sum, for updating the weights of said transversal digital filter.

17. A structure as in claim 15, wherein each processor further comprises means, coupled to receive said symbol and said weighted sum, for correcting a phase error in said weighted sum.

18. A structure as in claim 15, wherein, within each processor, each transversal digital filter is one of a plurality of transversal filters in a first level structure of said processor, said processor further comprising:

a plurality of non-linear operators, each non-linear operator operating on an output value of a corresponding one of said plurality of transversal filters to provide a first level equalized output value; and a transversal digital filter in a second level structure receiving said first level equalized output values for computing a weighted sum of said equalized output values to obtain said equalized sample.

19. A structure as in claim 16, wherein said weights are updated in accordance with an adaptive algorithm.

20. A structure as in claim 18, wherein said weights are updated in accordance with a backpropagation algorithm.

21. A structure as in claim 18, wherein said non-linear operators each comprise means for providing a differentiable function.

22. A method for equalizing and demodulating a structured signal, said structured signal having a predetermined number of symbols transmitted in a frame, said method comprises, for each of a first symbol position and a second symbol position in said frame, the steps of:

computing in a separate transversal digital filter a weighted sum of a predetermined number of samples of said structured signal and providing said weighted sum as an equalized sample; and determining in a decision device, coupled to receive said equalized sample, independently of symbol decisions at other symbol positions in said frame, a symbol transmitted at said symbol position in said frame.

23. A method as in claim 22, further comprising the step of updating the weights of said transversal digital filter.

24. A method as in claim 22, further comprising the step of correcting a phase error in said weighted sum using said symbol and said weighted sum.

25. A method as in claim 22, wherein said step of computing in a separate transversal digital filter provides a plurality of transversal filters in a first level structure, said method further comprising the steps of:

providing a plurality of non-linear operators, each non-linear operator operating on an output value of a corresponding one of said plurality of transversal filters to provide a first level equalized output value; and computing in a transversal digital filter in a second level a weighted sum of said first level equalized output values to obtain said equalized sample.

26. A method as in claim 23, wherein said weights are updated in accordance with an adaptive algorithm.

27. A method as in claim 25, wherein said weights are updated in accordance with a backpropagation algorithm.

28. A method as in claim 25, wherein said non-linear operator applies a differentiable function.

* * * * *

UNITED STATES PATENT AND TRADEMARK OFFICE
CERTIFICATE OF CORRECTION

PATENT NO.   : 5,524,124
DATED        : June 4, 1996
INVENTOR(S)  : Koenig

It is certified that error appears in the above-identified patent and that said Letters Patent is hereby corrected as shown below:

Col. 8, lines 24-25, equation should be after footnote number 3 at line 15.

Signed and Sealed this

Twenty-fifth Day of March, 1997

Attest:

*Attesting Officer*

BRUCE LEHMAN
*Commissioner of Patents and Trademarks*